US010243221B2

(12) United States Patent
Mitsuta et al.

(10) Patent No.: US 10,243,221 B2
(45) Date of Patent: Mar. 26, 2019

(54) RESIN-FRAMED MEMBRANE-ELECTRODE ASSEMBLY FOR FUEL CELL AND METHOD FOR MANUFACTURING THE SAME

(71) Applicant: HONDA MOTOR CO., LTD., Tokyo (JP)

(72) Inventors: Naoki Mitsuta, Wako (JP); Hiroshi Sohma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 377 days.

(21) Appl. No.: 14/958,932

(22) Filed: Dec. 4, 2015

(65) Prior Publication Data

US 2016/0164113 A1 Jun. 9, 2016

(30) Foreign Application Priority Data

Dec. 8, 2014 (JP) ................. 2014-247540

(51) Int. Cl.
*H01M 8/0273* (2016.01)
*H01M 8/242* (2016.01)
*H01M 8/0286* (2016.01)
*H01M 8/1018* (2016.01)

(52) U.S. Cl.
CPC ....... *H01M 8/0273* (2013.01); *H01M 8/0286* (2013.01); *H01M 8/242* (2013.01); *H01M 2008/1095* (2013.01); *Y02P 70/56* (2015.11)

(58) Field of Classification Search
CPC .. H01M 8/0273; H01M 8/0286; H01M 8/242; H01M 2008/1095; Y02P 70/56
See application file for complete search history.

(56) References Cited

U.S. PATENT DOCUMENTS

2010/0196784 A1* 8/2010 Kimura ............... H01M 8/0206
429/483
2013/0183604 A1* 7/2013 Tanaka ............... H01M 8/0289
429/480

FOREIGN PATENT DOCUMENTS

| JP | 2007-066766 | 3/2007 |
| JP | 2013-098155 | 5/2013 |
| JP | 2013-114993 | 6/2013 |
| JP | 2013-131417 | 7/2013 |

(Continued)

*Primary Examiner* — Sarah A. Slifka
*Assistant Examiner* — Lilia Nedialkova
(74) *Attorney, Agent, or Firm* — Mori & Ward, LLP

(57) ABSTRACT

A resin-framed membrane-electrode assembly for a fuel cell includes a stepped membrane-electrode assembly, a resin frame, and a water-impermeable layer. The stepped membrane-electrode assembly includes a solid polymer electrolyte membrane having a first surface and a second surface opposite to the first surface, a first electrode provided on the first surface, and a second electrode provided on the second surface. The second surface has an exposed surface on an area outside of an outer periphery of the second electrode. The water-impermeable layer is disposed on the exposed surface of the solid polymer electrolyte membrane so that the exposed surface is bonded to an inner protruding portion of the resin frame via the water-impermeable layer and an adhesive and so that a region of the exposed surface where the water-impermeable layer is disposed is larger than a region of the water-impermeable layer where the adhesive is applied.

20 Claims, 10 Drawing Sheets

(56) References Cited

FOREIGN PATENT DOCUMENTS

| | | |
|---|---|---|
| JP | 2013-168353 | 8/2013 |
| JP | 2013-239316 | 11/2013 |
| JP | 2014-017150 | 1/2014 |
| JP | 2014-026799 | 2/2014 |
| JP | 2014-029834 | 2/2014 |
| JP | 2014-137936 | 7/2014 |
| JP | 2015-076286 | 4/2015 |
| JP | 2015-090793 | 5/2015 |
| JP | 2015-125926 | 7/2015 |
| WO | WO 2013/042542 | 3/2013 |

* cited by examiner

RESIN-FRAMED MEMBRANE-ELECTRODE ASSEMBLY FOR FUEL CELL AND METHOD FOR MANUFACTURING THE SAME

CROSS-REFERENCE TO RELATED APPLICATIONS

The present application claims priority under 35 U.S.C. § 119 to Japanese Patent Application No. 2014-247540, filed Dec. 8, 2014, entitled "Resin-Framed Membrane-Electrode Assembly For Fuel Cell And Method For Manufacturing The Same." The contents of this application are incorporated herein by reference in their entirety.

BACKGROUND

1. Field

The present disclosure relates to a resin-framed membrane-electrode assembly for a fuel cell and a method for manufacturing a resin-framed membrane-electrode assembly for a fuel cell.

2. Description of the Related Art

Typical solid polymer electrolyte fuel cells include solid polymer electrolyte membranes formed of polymer ion exchange membranes. A fuel cell includes a membrane-electrode assembly (MEA) in which an anode electrode is disposed on one side of a solid polymer electrolyte membrane and a cathode electrode is disposed on the other side of the solid polymer electrolyte membrane. The anode electrode and the cathode electrode each have a catalyst layer (electrode catalyst layer) and a gas diffusion layer (porous carbon).

The membrane-electrode assembly is held between separators (bipolar plates) to form a fuel cell. A desired number of fuel cells are stacked, and the resulting fuel cell stack is used as an in-vehicle fuel cell stack, for example.

A membrane-electrode assembly may be configured as a so-called stepped MEA in which one of the gas diffusion layers has planar dimensions smaller than those of the solid polymer electrolyte membrane while the other gas diffusion layer has substantially the same planer dimensions as the solid polymer electrolyte membrane. In such a case, the MEA is combined with a resin frame member to decrease the amount of the relatively expensive solid polymer electrolyte membrane and protect the solid polymer electrolyte membrane which is a thin film having low strength. This type of MEA is called a resin-framed MEA.

An example of the resin-framed MEA is a membrane-electrode assembly disclosed in Japanese Unexamined Patent Application Publication No. 2007-66766. In this membrane-electrode assembly illustrated in FIG. 10, an anode catalyst layer 2a and an anode gas diffusion layer 2b both having the same outer dimensions as a membrane 1 are stacked on one surface of the membrane 1. A cathode catalyst layer 3a and a cathode gas diffusion layer 3b both having smaller outer dimensions than the membrane 1 are stacked on the other surface of the membrane 1. As a result, a stepped MEA 4 is configured.

The area of the anode gas diffusion layer 2b is set to be larger than the area of the cathode gas diffusion layer 3b. The membrane 1 has an outer perimeter portion on the cathode gas diffusion layer 3b side and the outer perimeter portion is bonded to a gasket structure 5 through a bonding portion 6.

According to Japanese Unexamined Patent Application Publication No. 2007-66766, the outer perimeter portion (flat surface) of the membrane 1 on the cathode gas diffusion layer 3b side is bonded to a flat surface of an inner perimeter thin portion 5a of the gasket structure 5 through the bonding portion 6 having a frame shape in a plan view.

SUMMARY

According to a first aspect of the present invention, a resin-framed membrane-electrode assembly for a fuel cell includes a stepped MEA and a resin frame member. The stepped MEA includes a solid polymer electrolyte membrane having a first surface and a second surface, a first electrode on the first surface, and a second electrode on the second surface. The first electrode has a planar dimension larger than a planar dimension of the second electrode. The resin frame member surrounds an outer perimeter of the solid polymer electrolyte membrane, and includes a thin inner protruding portion that protrudes from an inner perimeter base end and lies on a second electrode side. The second surface of the solid polymer electrolyte membrane includes an exposed surface exposed on an outer side of the second electrode, and the exposed surface is bonded to the inner protruding portion with an adhesive. A water-impermeable layer having a frame shape is disposed on the exposed surface of the solid polymer electrolyte membrane. The water-impermeable layer occupies a region larger than a region where the adhesive is applied. The resin frame member and the solid polymer electrolyte membrane are bonded to each other with the water-impermeable layer therebetween by using the adhesive.

According to a second aspect of the present invention, a resin-framed membrane-electrode assembly for a fuel cell includes a stepped membrane-electrode assembly, a resin frame, and a water-impermeable layer. The stepped membrane-electrode assembly includes a solid polymer electrolyte membrane having a first surface and a second surface opposite to the first surface, a first electrode provided on the first surface, and a second electrode provided on the second surface. The second surface has an exposed surface on an area outside of an outer periphery of the second electrode. The first electrode has a planar dimension larger than a planar dimension of the second electrode. The resin frame surrounds an outer periphery of the solid polymer electrolyte membrane and includes an inner periphery base end and an inner protruding portion. The inner protruding portion protrudes from the inner periphery base end so as to be provided on a second electrode side. The water-impermeable layer has a frame shape and is disposed on the exposed surface of the solid polymer electrolyte membrane so that the exposed surface is bonded to the inner protruding portion of the resin frame via the water-impermeable layer and an adhesive and so that a region of the exposed surface where the water-impermeable layer is disposed is larger than a region of the water-impermeable layer where the adhesive is applied. The resin frame and the solid polymer electrolyte membrane are bonded to each other via the water-impermeable layer and the adhesive.

According to a third aspect of the present invention, a method for manufacturing a resin-framed membrane-electrode assembly for a fuel cell includes providing a stepped membrane-electrode assembly. The stepped membrane-electrode assembly includes a solid polymer electrolyte membrane having a first surface and a second surface opposite to the first surface, a first electrode provided on the first surface, and a second electrode provided on the second surface. The second surface has an exposed surface on an area outside of an outer periphery of the second electrode. The first electrode has a planar dimension larger than a planar dimension of the second electrode. A resin frame to surround an outer periphery of the solid polymer electrolyte membrane is provided. The resin frame includes an inner periphery base end and an inner protruding portion. The inner protruding portion protrudes from the inner periphery base end so as to be provided on a second electrode side. A water-impermeable layer having a frame shape is provided on the exposed surface of the solid polymer electrolyte membrane so that the exposed surface is bonded to the inner protruding portion of the resin frame via the water-impermeable layer and an adhesive and so that a region of the exposed surface where the water-impermeable layer is disposed is larger than a region of the water-impermeable layer where the adhesive is applied. The resin frame and the solid polymer electrolyte membrane are bonded to each other via the water-impermeable layer and the adhesive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
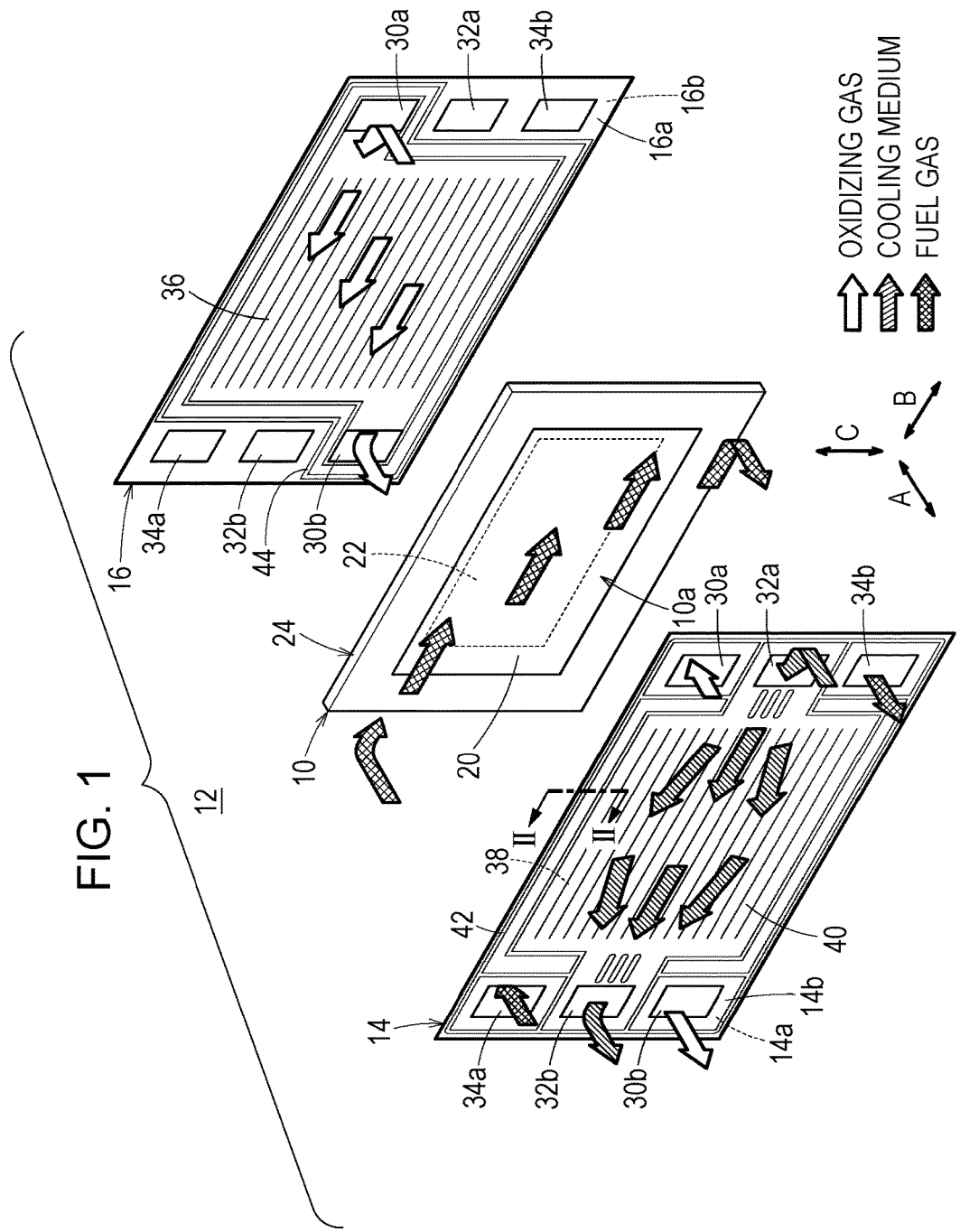
FIG. 1 is an exploded perspective view of a relevant part of a solid polymer electrolyte fuel cell that includes a resin-framed membrane-electrode assembly manufactured by a method according to an embodiment.

The embodiments will now be described with reference to the accompanying drawings, wherein like reference numerals designate corresponding or identical elements throughout the various drawings.

Figure 2:
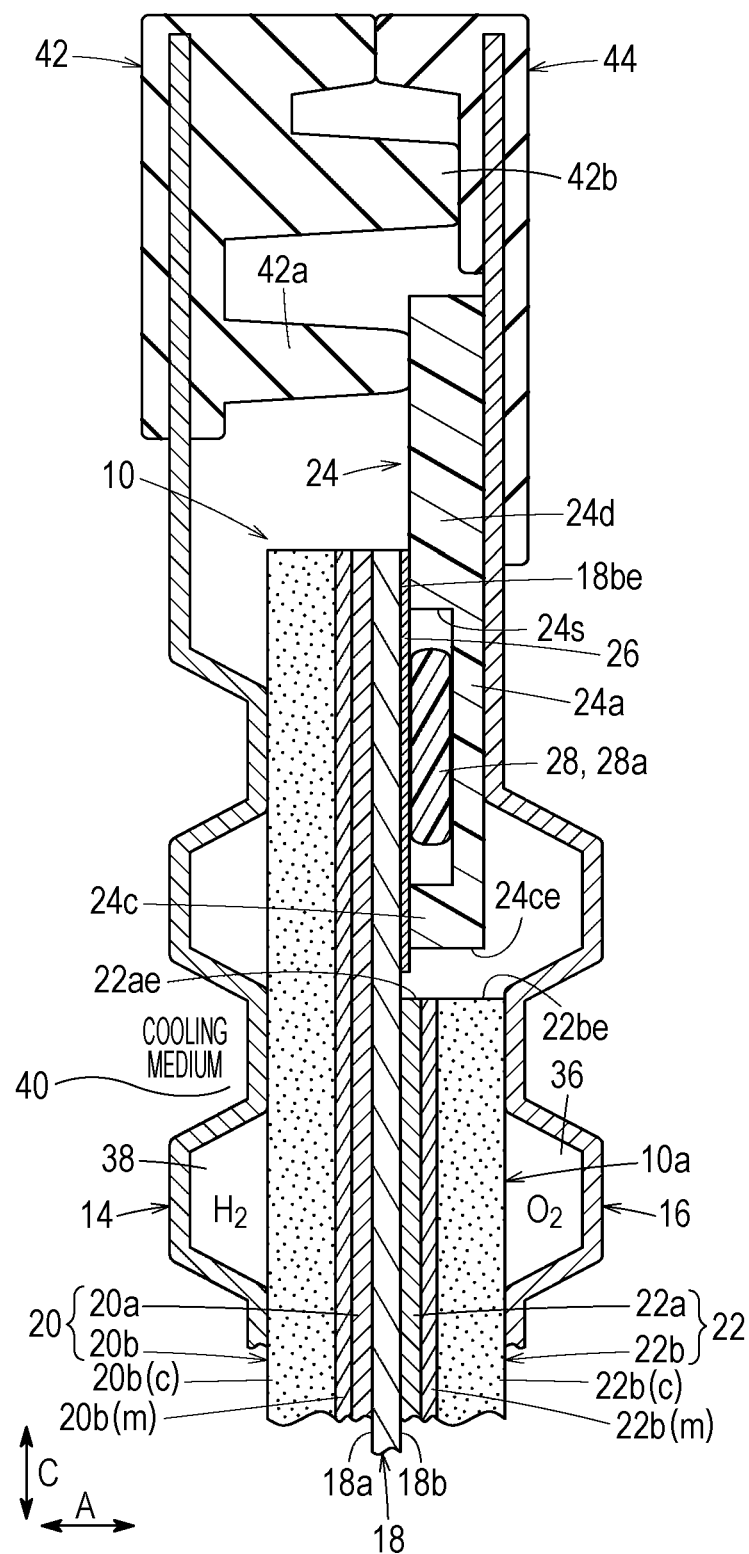
FIG. 2 is a cross-sectional view of the fuel cell taken along line II-II in FIG. 1.

Referring to FIGS. 1 and 2, a resin-framed membrane-electrode assembly 10 according to a first embodiment is built inside a solid polymer membrane fuel cell 12 having a rectangular shape in a landscape orientation (or a portrait orientation). Plural solid polymer membrane fuel cells 12 are stacked in, for example, the arrow A direction (horizontal direction) or the arrow C direction (gravity direction) to form a fuel cell stack. The fuel cell stack is used as an in-vehicle fuel cell stack to be used in fuel cell electric vehicles (not illustrated in the drawings), for example.

The solid polymer membrane fuel cell 12 includes the resin-framed membrane-electrode assembly 10 sandwiched between a first separator 14 and a second separator 16. The first separator 14 and the second separator 16 each have a rectangular shape in a landscape (or portrait) orientation. The first separator 14 and the second separator 16 are each formed of, for example, a carbon plate or a metal plate, such as a steel plate, a stainless steel plate, an aluminum plate, a coated steel sheet, or a metal plate with an anti-corrosion coating formed by surface treatment.

Figure 3:
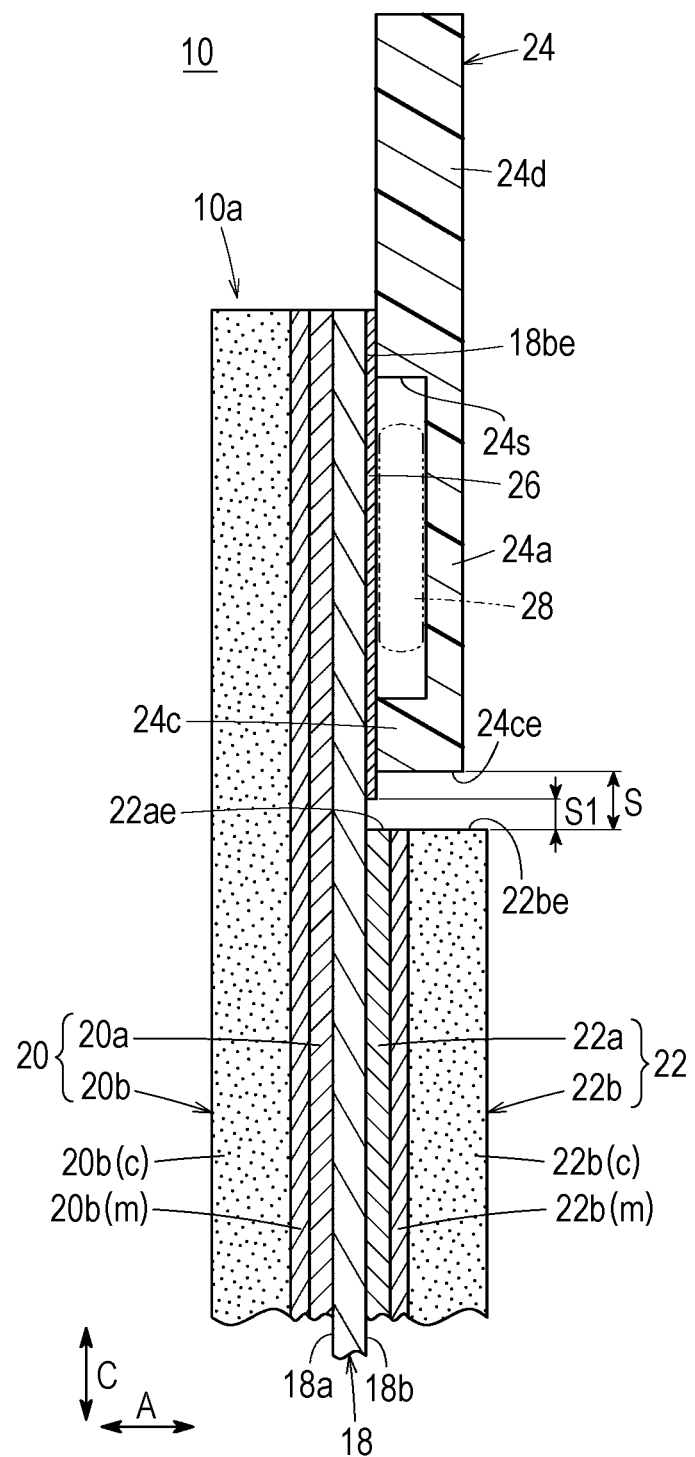
FIG. 3 is a cross-sectional view of a relevant part of the resin-framed membrane-electrode assembly.

As illustrated in FIGS. 2 and 3, the rectangular resin-framed membrane-electrode assembly 10 includes a stepped MEA 10a. The stepped MEA 10a includes a solid polymer electrolyte membrane (cation exchange membrane) 18 formed of a perfluorosulfonic acid thin membrane impregnated with water, and an anode electrode (first electrode) 20 and a cathode electrode (second electrode) 22 that sandwich the solid polymer electrolyte membrane 18. Instead of a fluorine-based electrolyte, a hydrocarbon (HC)-based electrolyte may be used in the solid polymer electrolyte membrane 18.

The cathode electrode 22 has a planar dimension (outer dimension) smaller than those of the solid polymer electrolyte membrane 18 and the anode electrode 20. Alternatively, the anode electrode 20 may be designed to have a planar dimension smaller than those of the cathode electrode 22 and the solid polymer electrolyte membrane 18. In such a case, the anode electrode 20 serves as the second electrode and the cathode electrode 22 serves as the first electrode.

The anode electrode 20 includes a first electrode catalyst layer 20a bonded to a surface 18a of the solid polymer electrolyte membrane 18, and a first gas diffusion layer 20b disposed on the first electrode catalyst layer 20a. The first electrode catalyst layer 20a and the first gas diffusion layer 20b have the same outer dimensions as each other and the same (or smaller) outer dimensions as (than) the solid polymer electrolyte membrane 18.

The cathode electrode 22 includes a second electrode catalyst layer 22a bonded to a surface 18b of the solid polymer electrolyte membrane 18, and a second gas diffusion layer 22b disposed on the second electrode catalyst layer 22a. The second electrode catalyst layer 22a and the second gas diffusion layer 22b have the same planar dimensions as each other and have smaller planar dimensions than the solid polymer electrolyte membrane 18. The outer perimeter (periphery) portion of the solid polymer electrolyte membrane 18 on the surface 18b side has an exposed surface 18be exposed on the outer side of the cathode electrode 22.

Although the second electrode catalyst layer 22a and the second gas diffusion layer 22b have the same planar dimensions as each other in the first embodiment, the planar dimension of the second electrode catalyst layer 22a may be larger (or smaller) than the planar dimension of the second gas diffusion layer 22b in other embodiments.

The first electrode catalyst layer 20a is formed by evenly applying porous carbon particles supporting a platinum alloy at their surfaces onto the surface of the first gas diffusion layer 20b, for example. The second electrode catalyst layer 22a is formed by evenly applying porous carbon particles supporting a platinum alloy at their surfaces onto the surface of the second gas diffusion layer 22b, for example.

The first gas diffusion layer 20b is constituted by a microporous layer 20b(m) having porosity and electrical conductivity and a carbon layer 20b(c) formed of carbon paper, carbon cloth, or the like. The second gas diffusion layer 22b is constituted by a microporous layer 22b(m) and a carbon layer 22b(c) formed of carbon paper, a carbon cloth, or the like. The planar dimensions of the second gas diffusion layer 22b are set to be smaller than the planar dimensions of the first gas diffusion layer 20b. The first electrode catalyst layer 20a and the second electrode catalyst layer 22a are respectively formed on two surfaces of the solid polymer electrolyte membrane 18.

The resin-framed membrane-electrode assembly 10 includes a film-shape resin frame member (resin film, resin frame) 24 that surrounds the outer perimeter of the solid polymer electrolyte membrane 18 and that is bonded to the anode electrode 20 and the cathode electrode 22.

The resin frame member 24 is formed of, for example, polyphenylene sulfide (PPS), polyphthalamide (PPA), polyethylene naphthalate (PEN), polyether sulfone (PES), liquid crystal polymer (LCP), polyvinylidene fluoride (PVDF), silicone resin, fluorocarbon resin, or modified polyphenylene ether resin (m-PPE). The resin frame member 24 may be formed of polyethylene terephthalate (PET), polybutylene terephthalate (PBT), or a modified polyolefin, for example.

Figure 4:
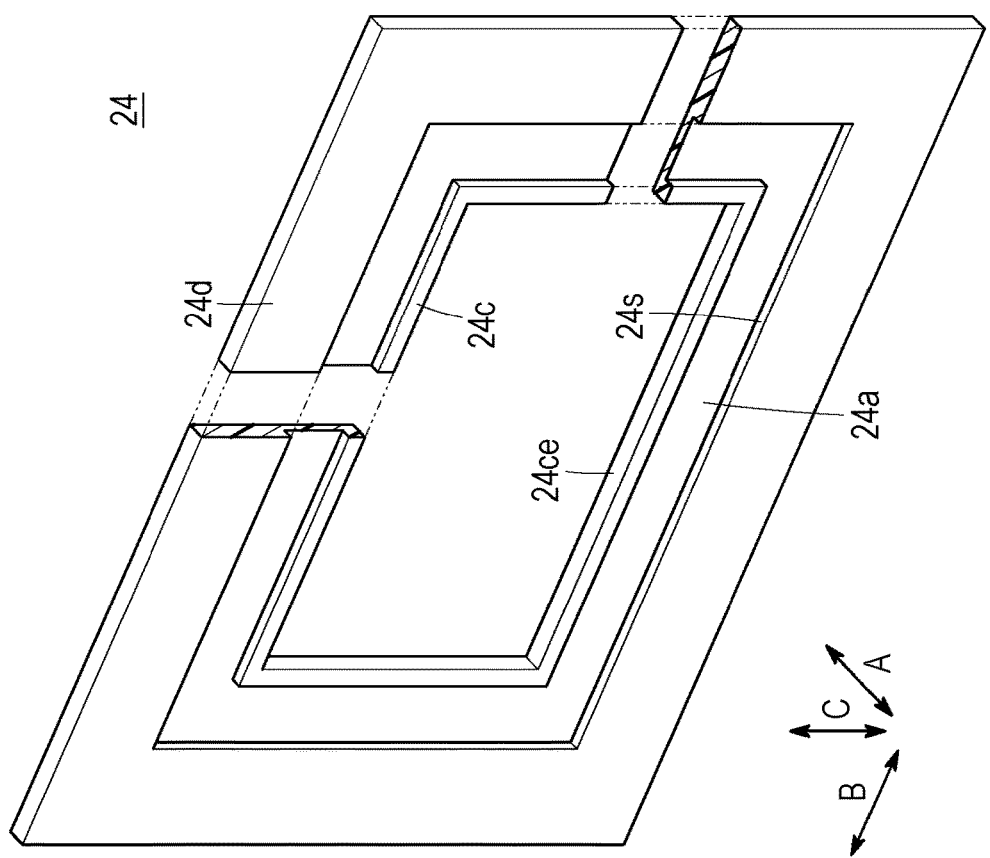
FIG. 4 is a perspective view of a resin frame member of the resin-framed membrane-electrode assembly.

As illustrated in FIGS. 2 to 4, the resin frame member 24 includes an inner protruding portion 24a that protrudes from an inner perimeter base end (inner periphery base end) 24s and lies on the cathode electrode 22 side. The inner protruding portion 24a extends inward from the inner perimeter base end 24s by a predetermined length, and an inner raised portion 24c that is raised in a thickness direction is formed at an inner perimeter end portion 22ce of the inner protruding portion 24a.

The inner raised portion 24c is arranged to be near an outer perimeter end portion 22ae of the second electrode catalyst layer 22a and an outer perimeter end portion 22be of the second gas diffusion layer 22b. A space S is formed between the inner raised portion 24c (the inner perimeter end portion of the inner protruding portion 24a) and the outer perimeter end portion of the cathode electrode 22 (see FIG. 3).

The resin frame member 24 also includes an outer raised portion 24d continuous from the inner perimeter base end 24s. The outer raised portion 24d is in contact with a tip of the exposed surface 18be of the solid polymer electrolyte membrane 18. The outer raised portion 24d has a frame shape and surrounds the outer perimeter tip of the exposed surface 18be.

A frame-shaped water-impermeable layer 26 is formed on the exposed surface 18be of the solid polymer electrolyte membrane 18. The water-impermeable layer 26 occupies a region larger than the region to which an adhesive 28a is applied as described below. The water-impermeable layer 26 has water-impermeability and good adhesion to the solid polymer electrolyte membrane 18. The water-impermeable layer 26 may be prepared by using, for example, a pressure-sensitive adhesive described below, a liquid fluoro-elastomer, an epoxy-modified silicone resin, an acrylic resin, or a perfluorosulfonic acid having a lower ion exchange capacity (IEC) (high EW) than PEM. Alternatively, the water-impermeable layer 26 may be formed by placing a hot melt sheet but not by a spraying technique. Examples of the hot melt include acrylic, urethane, epoxy, and ester hot melts.

The water-impermeable layer 26 is arranged so that the inner perimeter end portion thereof lies at a position distant from the outer perimeter end portion of the cathode electrode 22 by a distance equal to a space S1 in the outward direction and that the outer perimeter end portion thereof lies at the same position as the outer perimeter end portion of the solid polymer electrolyte membrane 18. The space S1 is smaller than the space S between the inner raised portion 24c and the outer perimeter end portion of the cathode electrode 22. The exposed surface 18be is directly exposed between the inner perimeter end portion of the water-impermeable layer 26 and the outer perimeter end portion of the cathode electrode 22. The thickness of the water-impermeable layer 26 is smaller than the resin frame member 24.

The inner raised portion 24c, the outer raised portion 24d, and the water-impermeable layer 26 shape an adhesive layer 28 formed by application of the adhesive 28a. The inner raised portion 24c and a part of the outer raised portion 24d overlap the water-impermeable layer 26 in a stacking direction (arrow A direction). The exposed surface 18be and the inner protruding portion 24a are bonded to each other with the water-impermeable layer 26 therebetween by using the adhesive 28a.

The adhesive 28a used to form the adhesive layer 28 is, for example, an epoxy adhesive, an acrylic adhesive, a polymer, or a fluorine-based elastomer. The adhesive 28a may be of any type and is not limited to a liquid, solid, thermoplastic, or thermosetting type, for example.

As illustrated in FIG. 1, an oxidizing gas inlet manifold 30a, a cooling medium inlet manifold 32a, and a fuel gas outlet manifold 34b are formed in one end portion of the fuel cell 12 in the arrow B direction (horizontal direction in FIG. 1). An oxidizing gas, for example, an oxygen-containing gas, is supplied through the oxidizing gas inlet manifold 30a. A cooling medium is supplied through the cooling medium inlet manifold 32a. A fuel gas, for example, a hydrogen-containing gas, is discharged though the fuel gas outlet manifold 34b. The oxidizing gas inlet manifold 30a, the cooling medium inlet manifold 32a, and the fuel gas outlet manifold 34b align with one another in the arrow C direction (perpendicular direction).

A fuel gas inlet manifold 34a through which a fuel gas is supplied, a cooling medium outlet manifold 32b through which a cooling medium is discharged, and an oxidizing gas outlet manifold 30b through which an oxidizing gas is discharged are formed in the other end of the fuel cell 12 in the arrow B direction. The fuel gas inlet manifold 34a, the cooling medium outlet manifold 32b, and the oxidizing gas outlet manifold 30b align with one another in the arrow C direction.

The second separator 16 has a surface 16a facing the resin-framed membrane-electrode assembly 10. Plural oxidizing gas channels 36 that are in communication with the oxidizing gas inlet manifold 30a and the oxidizing gas outlet manifold 30b and extend in the arrow B direction are formed on the surface 16a.

The first separator 14 has a surface 14a facing the resin-framed membrane-electrode assembly 10. Plural fuel gas channels 38 that are in communication with the fuel gas inlet manifold 34a and the fuel gas outlet manifold 34b and extend in the arrow B direction are formed on the surface 14a. Plural cooling medium channels 40 that are in communication with the cooling medium inlet manifold 32a and the cooling medium outlet manifold 32b and extend in the arrow B direction are formed between a surface 14b of the first separator 14 and a surface 16b of the second separator 16 adjacent to each other.

As illustrated in FIGS. 1 and 2, a first sealing member 42 surrounds the outer perimeter end portion of the first separator 14 and are combined with the surfaces 14a and 14b of the first separator 14 in that portion. A second sealing member 44 surrounds the outer perimeter end portion of the second separator 16 and are combined with the surfaces 16a and 16b of the second separator 16 in that portion.

As illustrated in FIG. 2, the first sealing member 42 has a first projecting seal 42a in contact with the resin frame member 24 of the resin-framed membrane-electrode assembly 10 and a second projecting seal 42b in contact with the second sealing member 44 combined with the second separator 16. The second sealing member 44 has a flat surface that contacts the second projecting seal 42b and that extends along the separator surface. This flat surface constitutes a flat seal. Alternatively, a projecting seal (not illustrated) may be formed on the second sealing member 44 instead of the second projecting seal 42b.

Examples of the first sealing member 42 and the second sealing member 44 include elastic sealing members formed of sealing materials, cushion materials, or packing materials such as EPDM, NBR, fluororubber, silicone rubber, fluorosilicone rubber, butyl rubber, natural rubber, styrene rubber, chloroprene rubber, or acryl rubber.

A method for manufacturing the resin-framed membrane-electrode assembly 10 according to a first embodiment will now be described.

First, a stepped MEA 10a is manufactured. Separately, a resin frame member 24 is prepared by injection molding using a die (not illustrated). The stepped MEA 10a is manufactured by applying a slurry containing carbon black and PTFE particles onto a flat surface of a carbon paper, drying the slurry to form a microporous layer 20b(m) that serves as an underlayer, bonding a carbon layer 20b(c) onto the microporous layer 20b(m) to form a first gas diffusion layer 20b, forming a microporous layer 22b(m) by the same process as the microporous layer 20b(m), and bonding a carbon layer 22b(c) onto the microporous layer 22b(m) so as to form a second gas diffusion layer 22b.

After adding a solvent to an electrode catalyst, for example, a perfluoroalkylene sulfonic acid solution serving as an ion-conductive polymer binder solution is added to the mixture. The solvent is added until a desired ink viscosity is achieved. Thus, an anode electrode ink and a cathode electrode ink are obtained.

Figure 5:
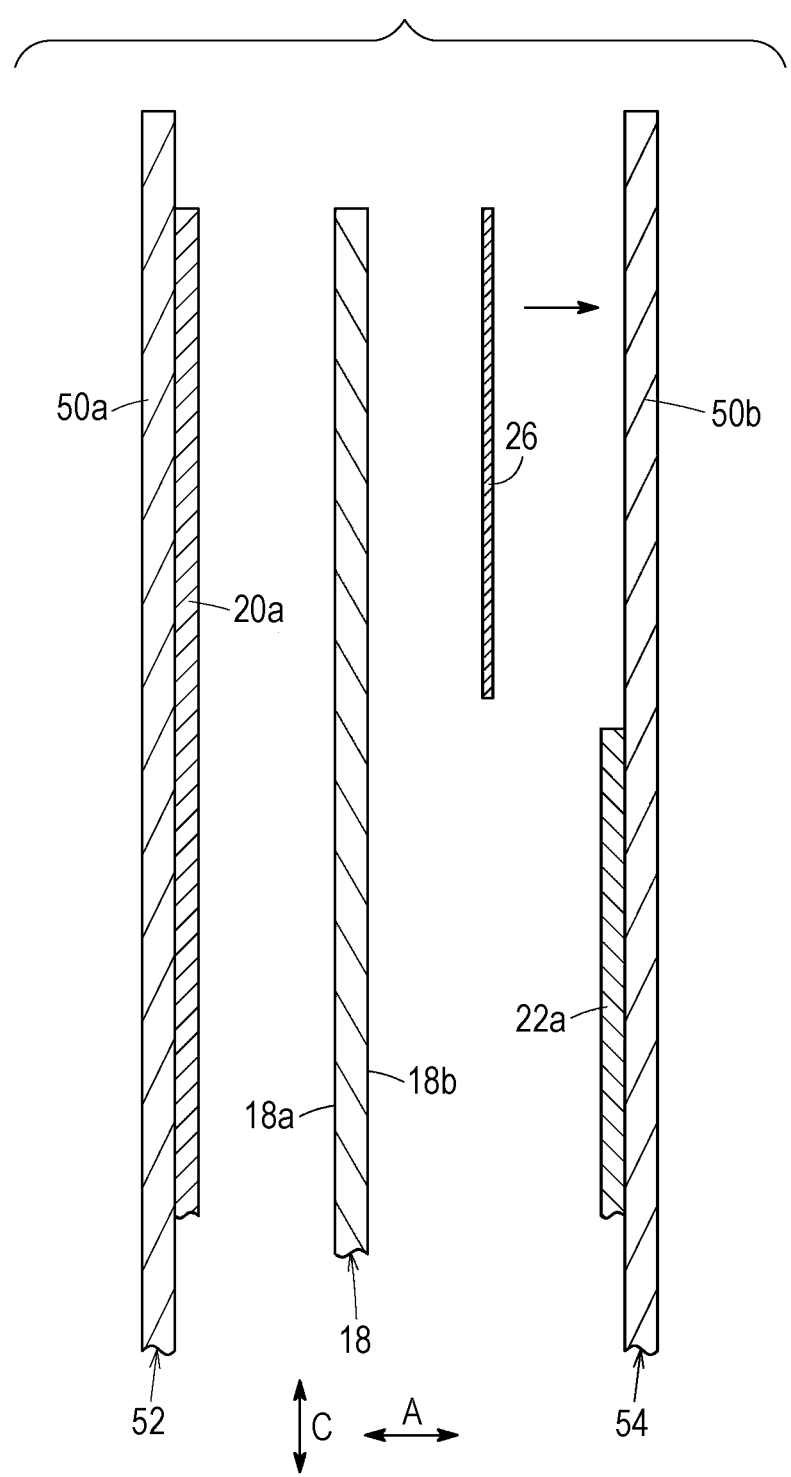
FIG. 5 is a diagram illustrating formation of a CCM included in the resin-framed membrane-electrode assembly according to a manufacturing method of a first embodiment.

As illustrated in FIG. 5, the anode electrode ink is applied to a PET film 50a by screen-printing, and an anode electrode sheet 52 having a first electrode catalyst layer 20a is obtained as a result. The first electrode catalyst layer 20a has the same planar dimension as the solid polymer electrolyte membrane 18.

Similarly, the cathode electrode ink is applied to a PET film 50b by screen-printing, and a cathode electrode sheet 54 having a second electrode catalyst layer 22a is obtained as a result. The second electrode catalyst layer 22a has a smaller planar dimension than the solid polymer electrolyte membrane 18.

Next, a water-impermeable layer 26 is formed on an outer perimeter portion of the PET film 50b so as to be at a position distant from the second electrode catalyst layer 22a in the outward direction (so as not to overlap the electrode surface). Specifically, a surface where the electrode is to be formed on the cathode electrode sheet 54 is covered with a mask, and a pressure-sensitive adhesive is applied by spraying around the mask and dried to form the water-impermeable layer 26.

The solid polymer electrolyte membrane 18 being held between the anode electrode sheet 52 and the cathode electrode sheet 54 is then hot-pressed. The PET films 50a and 50b are removed. As a result, a catalyst-coated membrane (CCM) is obtained. The CCM is sandwiched between the first gas diffusion layer 20b and the second gas diffusion layer 22b and integrated with the first gas diffusion layer 20b and the second gas diffusion layer 22b by hot-pressing so as to form a stepped MEA 10a (see FIG. 6).

As illustrated in FIG. 4, the resin frame member 24 includes an inner protruding portion 24a having a small thickness. The resin frame member 24 also includes an outer raised portion 24d that is continuous from an inner perimeter base end 24s. An inner raised portion 24c corresponding to the outer raised portion 24d is formed at the inner perimeter end of the inner protruding portion 24a.

Figure 6:
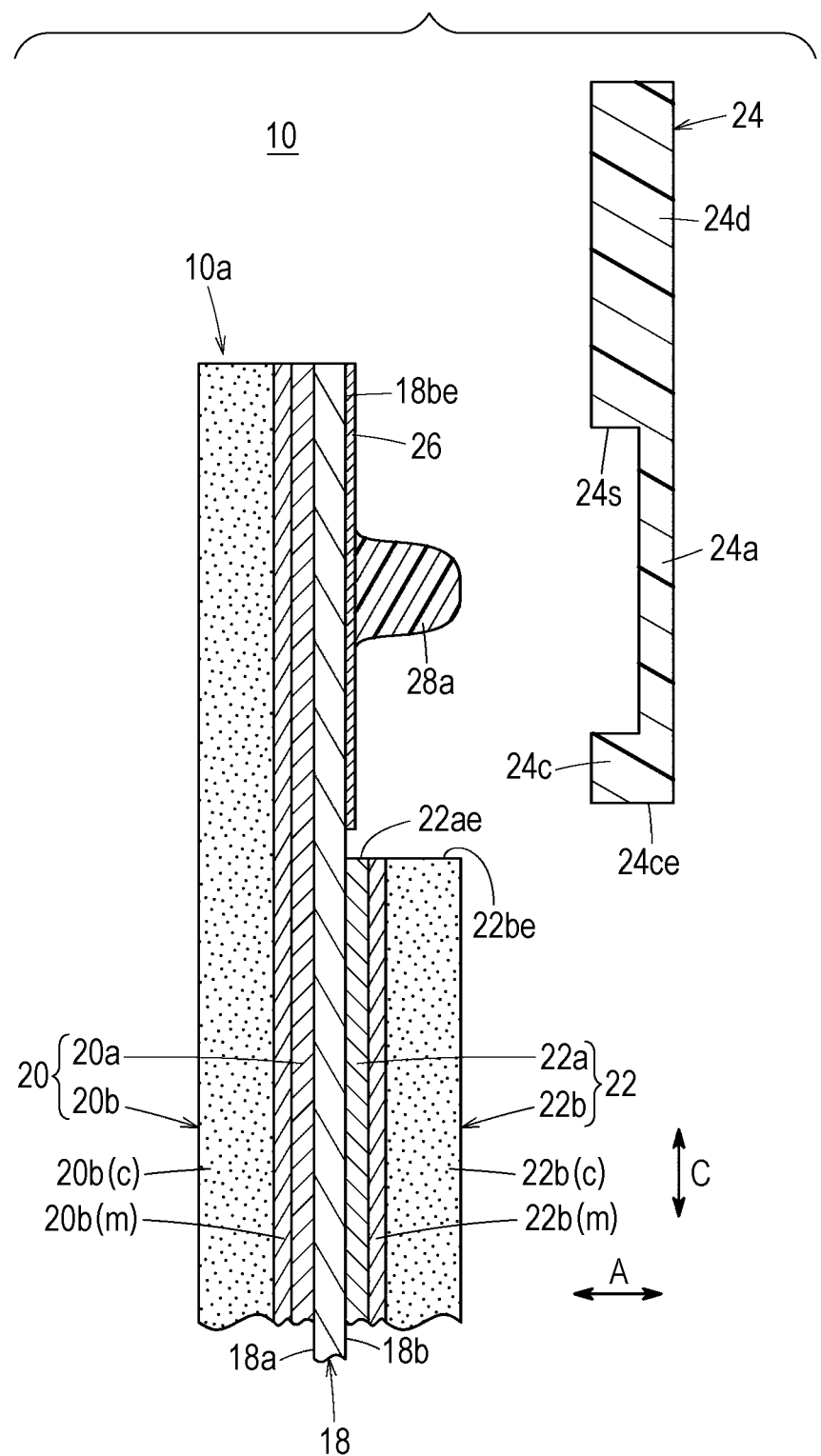
FIG. 6 is a diagram illustrating bonding of a stepped MEA to a resin frame member according to the manufacturing method.

Next, as illustrated in FIG. 6, an adhesive 28a is applied to the exposed surface 18be of the solid polymer electrolyte membrane 18, i.e., on the water-impermeable layer 26, by using a dispenser not illustrated in the drawings for example. Alternatively, the adhesive 28a may be applied to an inner flat surface of the inner protruding portion 24a of the resin frame member 24.

Figure 7:
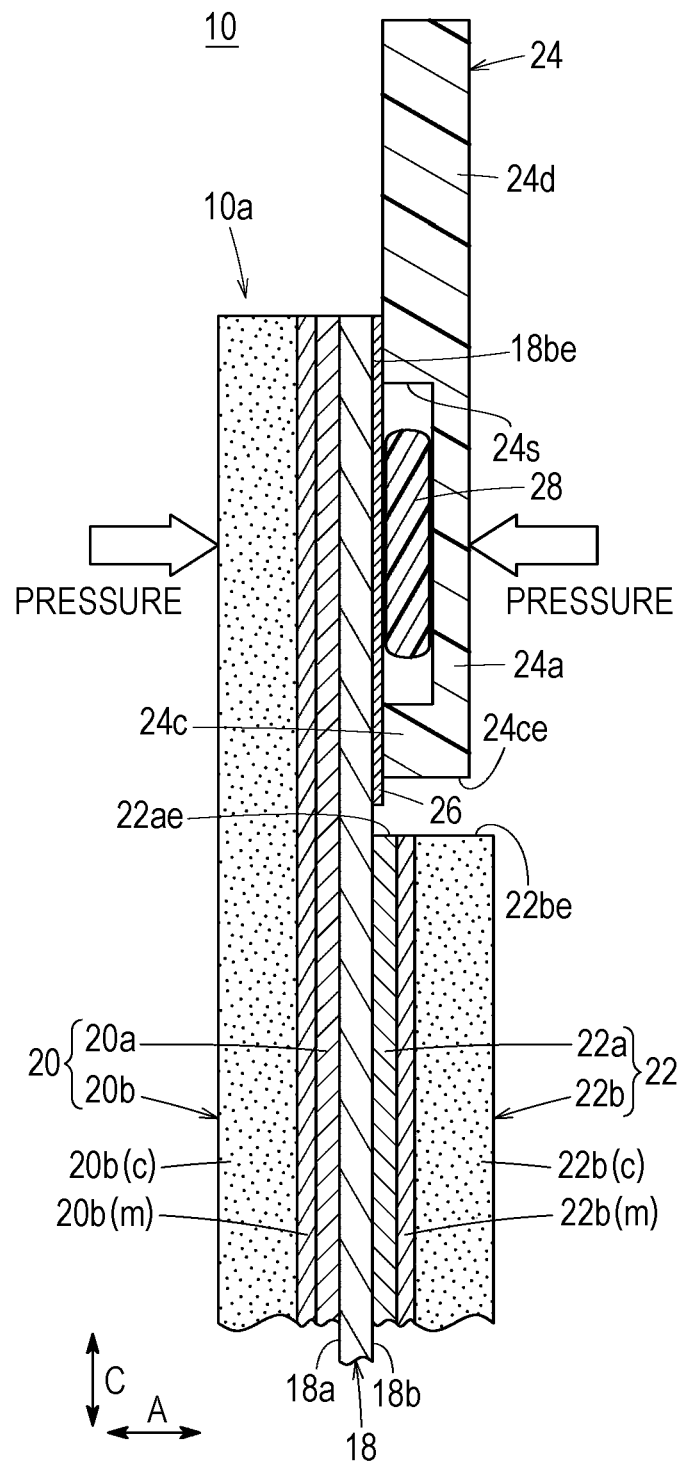
FIG. 7 is a diagram illustrating a process of bonding the stepped MEA to the resin frame member according to the manufacturing method.

Then as illustrated in FIG. 7, the resin frame member 24 is pressed against the solid polymer electrolyte membrane 18 so that the inner raised portion 24c and the outer raised portion 24d contact (or adjoin) the water-impermeable layer 26. As a result, the adhesive 28a spreads and form an adhesive layer 28, and the exposed surface 18be of the solid polymer electrolyte membrane 18 and the inner protruding portion 24a become bonded to each other with the water-impermeable layer 26 therebetween. Thus, a resin-framed membrane-electrode assembly 10 is manufactured.

Referring to FIG. 2, the resin-framed membrane-electrode assembly 10 is sandwiched between the first separator 14 and the second separator 16. The second separator 16 is in contact with the inner protruding portion 24a of the resin frame member 24, and applies load to the resin-framed membrane-electrode assembly 10 together with the first separator 14. A predetermined number of fuel cells 12 are stacked to form a fuel cell stack, and a clamping load is applied between end plates not illustrated in the drawings.

The operation of the fuel cell 12 obtained as above will now be described.

First, as illustrated in FIG. 1, an oxidizing gas such as an oxygen-containing gas is supplied through the oxidizing gas inlet manifold 30a, and a fuel gas such as a hydrogen-containing gas is supplied through the fuel gas inlet manifold 34a. A cooling medium such as pure water, ethylene glycol, or oil is supplied through the cooling medium inlet manifold 32a.

The oxidizing gas is introduced from the oxidizing gas inlet manifold 30a to the oxidizing gas channels 36 on the second separator 16, travels in the arrow B direction, and reaches the cathode electrode 22 of the stepped MEA 10a. The fuel gas is introduced from the fuel gas inlet manifold 34a to the fuel gas channels 38 on the first separator 14. The fuel gas travels in the arrow B direction through the fuel gas channels 38 and reaches the anode electrode 20 of the stepped MEA 10a.

Accordingly, in each stepped MEA 10a, the oxidizing gas supplied to the cathode electrode 22 and the fuel gas supplied to the anode electrode 20 are consumed through the electrochemical reactions inside the second electrode catalyst layer 22a and the first electrode catalyst layer 20a, and power is generated.

The oxidizing gas supplied to and consumed in the cathode electrode 22 is discharged in the arrow A direction through the oxidizing gas outlet manifold 30b. Similarly, fuel gas supplied to and consumed in the anode electrode 20 is discharged in the arrow A direction through the fuel gas outlet manifold 34b.

The cooling medium supplied to the cooling medium inlet manifold 32a is introduced to the cooling medium channels 40 between the first separator 14 and the second separator 16 and distributed in the arrow B direction. The cooling medium cools the stepped MEA 10a and is then discharged from the cooling medium outlet manifold 32b.

In this case in the first embodiment, as illustrated in FIGS. 2 and 3, the region of the exposed surface 18be of the solid polymer electrolyte membrane 18 where the water-impermeable layer 26 is formed is larger than the region where the adhesive 28a is applied (or the adhesive layer 28 is formed). The inner protruding portion 24a of the resin frame member 24 and the exposed surface 18be of the solid polymer electrolyte membrane 18 are bonded with each other with the water-impermeable layer 26 therebetween by using the adhesive 28a.

Accordingly, water vapor released from the solid polymer electrolyte membrane 18 having a hygroscopic property is blocked by the water-impermeable layer 26 and does not penetrate the interface with the adhesive 28a. Thus, moisture can be prevented from staying in the adhesive layer 28. The water-impermeable layer 26 is arranged so that the inner perimeter end portion thereof lies at a position distant from the outer perimeter end portion of the cathode electrode 22 by a distance of the space S1 in the outward direction (see FIG. 3). Due to this arrangement, water vapor released from the solid polymer electrolyte membrane 18 is discharged to outside from the outer perimeter end portion of the water-impermeable layer 26 and through the space S1.

Accordingly, in the first embodiment, changes occurring in the adhesive layer 28 over time can be satisfactorily suppressed and the bonding strength can be maintained by a simple structure and process. Thus, the stepped MEA 10a can be strongly and satisfactorily bonded to the resin frame member 24.

Next, a manufacturing method according to a second embodiment is described. The steps identical to those of the first embodiment are not described in detail to avoid redundancy.

Figure 8:
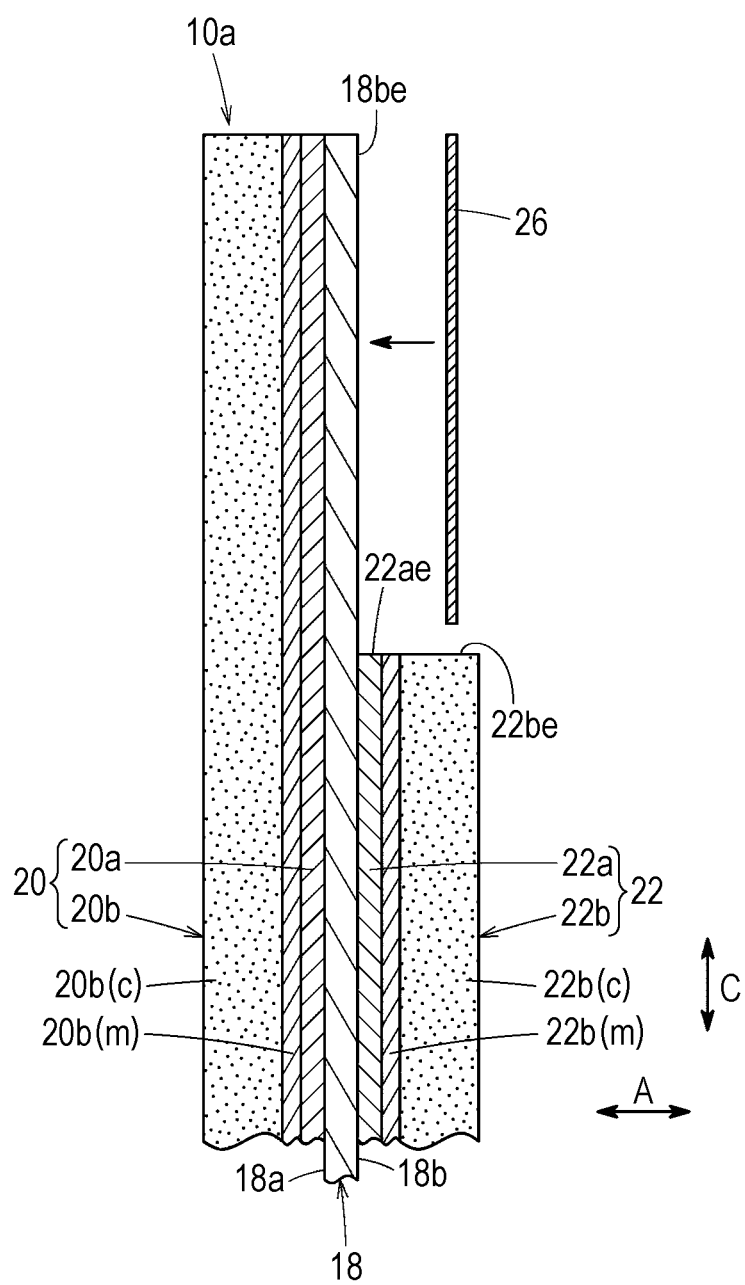
FIG. 8 is a diagram illustrating formation of a water-impermeable layer on the stepped MEA according to a manufacturing method of a second embodiment.

In the second embodiment, as illustrated in FIG. 8, the stepped MEA 10a is manufactured without forming the water-impermeable layer 26 in advance. The water-impermeable layer 26 is then formed by applying a pressure-sensitive adhesive to the exposed surface 18be of the solid polymer electrolyte membrane 18 of the stepped MEA 10a.

As such, in the second embodiment, the water-impermeable layer 26 is formed on the exposed surface 18be of the solid polymer electrolyte membrane 18, and the same effects as those in the first embodiment are achieved.

Figure 9:
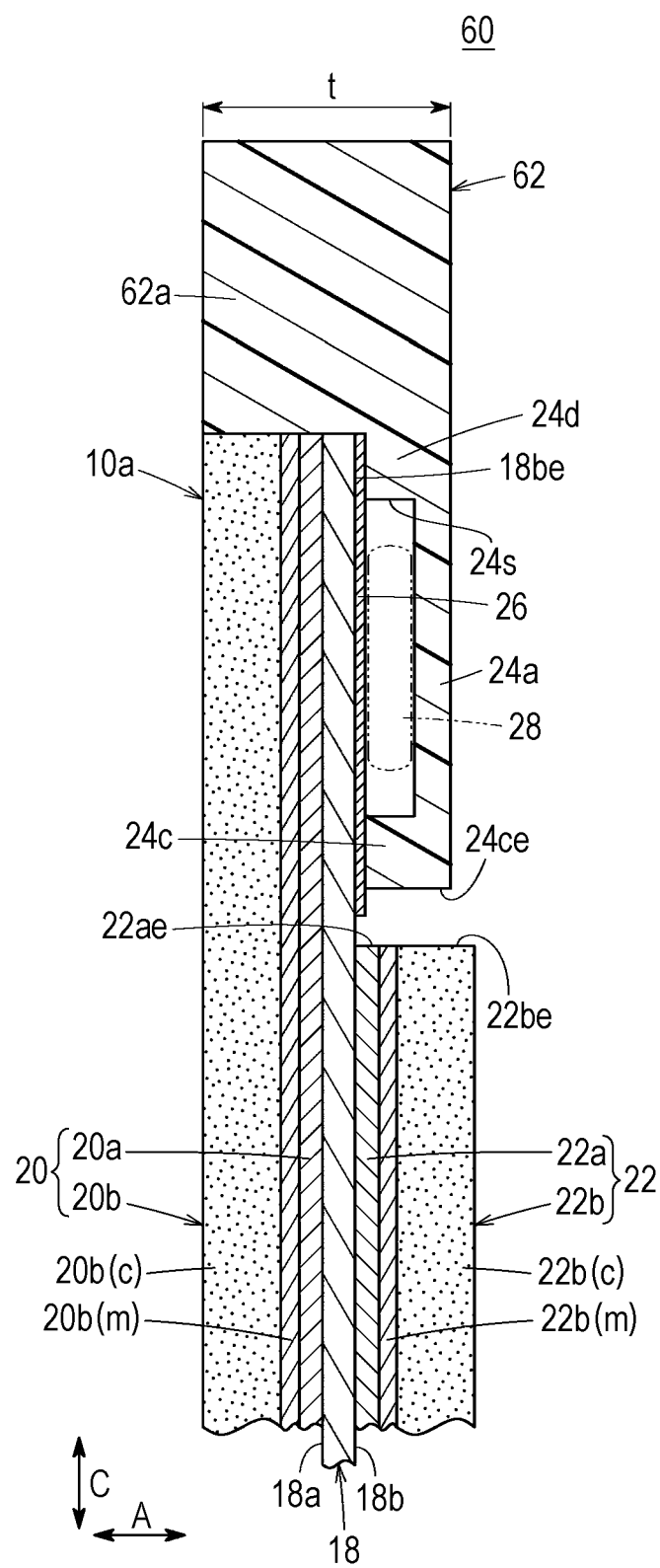
FIG. 9 is a cross-sectional view of a relevant part of another resin-framed membrane-electrode assembly manufactured by the method.
Figure 10:
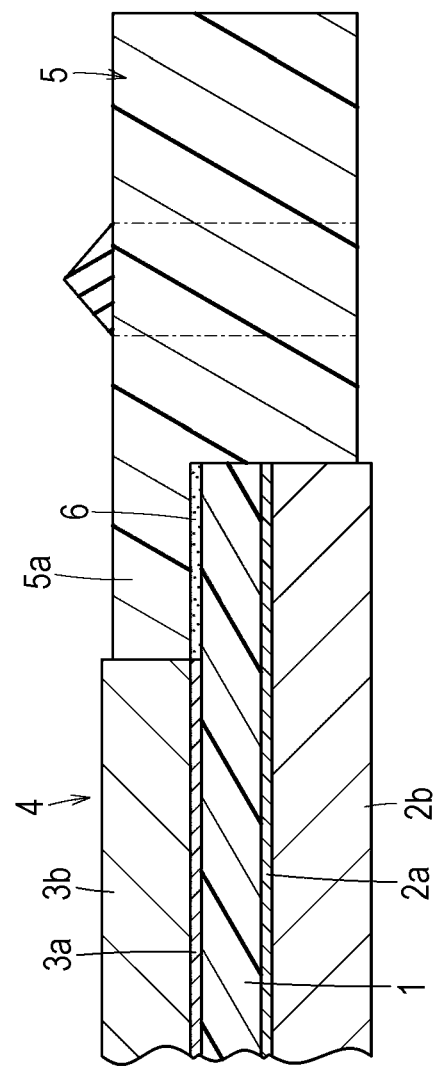
FIG. 10 is a diagram illustrating a membrane-electrode assembly disclosed in Japanese Unexamined Patent Application Publication No. 2007-66766.

FIG. 9 is a cross-sectional view of a relevant part of another resin-framed membrane-electrode assembly 60 formed by the manufacturing method of the first or second embodiment. The same components as those of the resin-framed membrane-electrode assembly 10 are denoted by the same reference numerals and the detailed descriptions thereof are omitted.

The resin-framed membrane-electrode assembly 60 includes a stepped MEA 10a and a resin frame member 62. The resin frame member 62 does not have a film shape but is a relatively thick frame. The resin frame member 62 has a thick portion 62a having a maximum thickness t. The maximum thickness t is equal to (or different from) the sum of the thickness of the solid polymer electrolyte membrane 18 and the thickness of the anode electrode 20.

The resin-framed membrane-electrode assembly 60 having the above-described structure has the same effects as those of the resin-framed membrane-electrode assembly 10.

A resin-framed membrane-electrode assembly for a fuel cell according to an aspect of the present disclosure and a resin-framed membrane-electrode assembly for a fuel cell manufactured by a method according to an aspect of the present disclosure each include a stepped MEA and a resin frame member. The step MEA includes a solid polymer electrolyte membrane having a first surface and a second surface, a first electrode on the first surface, and a second electrode on the second surface, the first electrode having a planar dimension larger than a planar dimension of the second electrode.

The resin frame member surrounds an outer perimeter of the solid polymer electrolyte membrane, and includes a thin inner protruding portion that protrudes from an inner perimeter base end and lies on a second electrode side. The second surface of the solid polymer electrolyte membrane includes an exposed surface exposed on an outer side of the second electrode, and the exposed surface is bonded to the inner protruding portion with an adhesive.

A water-impermeable layer having a frame shape is disposed on the exposed surface of the solid polymer electrolyte membrane, the water-impermeable layer occupying a region larger than a region where the adhesive is applied, and the resin frame member and the solid polymer electrolyte membrane are bonded to each other with the water-impermeable layer therebetween by using the adhesive. According to this structure, water vapor released from the solid polymer electrolyte membrane is blocked by the water-impermeable layer and does not penetrate the interface with the adhesive.

The resin frame member preferably further includes an inner raised portion that is raised in a thickness direction and is disposed at an inner perimeter end portion of the inner protruding portion, and an outer raised portion that is raised in the thickness direction and is disposed at the inner perimeter base end. In such a case, the inner raised portion, the outer raised portion, and the water-impermeable layer preferably shape an adhesive layer formed by application of the adhesive, and the inner raised portion and a part of the outer raised portion preferably overlap the water-impermeable layer.

In this resin-framed membrane-electrode assembly for a fuel cell, a space is preferably formed between an inner perimeter end portion of the water-impermeable layer and an outer perimeter end portion of the second electrode.

The manufacturing method includes a step of forming a water-impermeable layer having a frame shape on the exposed surface of the solid polymer electrolyte membrane so that the water-impermeable layer occupies a region larger than a region where the adhesive is applied; and a step of bonding the resin frame member and the solid polymer electrolyte membrane to each other with the water-impermeable layer therebetween by using the adhesive.

According to the above-described aspects of the disclosure, changes that occur over time in the adhesive used in the resin-framed membrane-electrode assembly can be satisfactorily suppressed and bonding strength can be maintained by a simple structure and a simple process so that a membrane-electrode assembly and a resin frame member can be can be bonded to each other strongly and satisfactorily.

Obviously, numerous modifications and variations of the present invention are possible in light of the above teachings. It is therefore to be understood that within the scope of the appended claims, the invention may be practiced otherwise than as specifically described herein.

What is claimed is:

1. A resin-framed membrane-electrode assembly for a fuel cell, comprising:
   a stepped membrane-electrode assembly that includes
      a solid polymer electrolyte membrane having a first surface and a second surface,
      a first electrode on the first surface, and
      a second electrode on the second surface, the first electrode having a planar dimension larger than a planar dimension of the second electrode; and
   a resin frame member that surrounds an outer perimeter of the solid polymer electrolyte membrane, and includes an inner protruding portion that protrudes from an inner perimeter base end and lies on a second electrode side, wherein:
   the second surface of the solid polymer electrolyte membrane includes an exposed surface exposed on an outer side of the second electrode, and the exposed surface is bonded to the inner protruding portion with an adhesive layer,
   a water-impermeable layer having a frame shape is disposed on the exposed surface of the solid polymer electrolyte membrane, the water-impermeable layer occupying a region larger than a region where the adhesive layer is applied, the water-impermeable layer overlapping the adhesive layer in a thickness direction, the water-impermeable layer being a different material than the adhesive layer,
   the resin frame member and the solid polymer electrolyte membrane are bonded to each other with the water-impermeable layer therebetween by using the adhesive layer, and
   the water-impermeable layer is disposed so as to block water released from the solid polymer electrolyte membrane and prevent the water from reaching an interface with the adhesive layer.

2. The resin-framed membrane-electrode assembly for a fuel cell according to claim 1, wherein the resin frame member further includes
   an inner raised portion that is raised in the thickness direction and is disposed at an inner perimeter end portion of the inner protruding portion, and
   an outer raised portion that is raised in the thickness direction and is disposed at the inner perimeter base end,
   the inner raised portion, the outer raised portion, and the water-impermeable layer shape the adhesive layer formed by application of an adhesive, and
   the inner raised portion and a part of the outer raised portion overlap the water-impermeable layer.

3. The resin-framed membrane-electrode assembly for a fuel cell according to claim 1, wherein a space is formed between an inner perimeter end portion of the water-impermeable layer and an outer perimeter end portion of the second electrode.

4. The resin-framed membrane-electrode assembly for a fuel cell according to claim 1, wherein a part of the water-impermeable layer overlaps an inner peripheral end surface of the resin frame member in the thickness direction of the resin frame member.

5. The resin-framed membrane-electrode assembly for a fuel cell according to claim 1, wherein the water-impermeable layer includes a pressure-sensitive adhesive, a liquid fluoro-elastomer, an epoxy-modified silicone resin, an acrylic resin, or a perfluorosulfonic acid.

6. The resin-framed membrane-electrode assembly for a fuel cell according to claim 5, wherein the adhesive includes an epoxy adhesive, an acrylic adhesive, a polymer, or a fluorine-based elastomer.

7. A resin-framed membrane-electrode assembly for a fuel cell, comprising:
   a stepped membrane-electrode assembly comprising:
      a solid polymer electrolyte membrane having a first surface and a second surface opposite to the first surface;
      a first electrode provided on the first surface; and
      a second electrode provided on the second surface, the second surface having an exposed surface on an area outside of an outer periphery of the second electrode, the first electrode having a planar dimension larger than a planar dimension of the second electrode;
   a resin frame surrounding an outer periphery of the solid polymer electrolyte membrane and comprising:
      an inner periphery base end; and
      an inner protruding portion protruding from the inner periphery base end so as to be provided on a second electrode side; and
   a water-impermeable layer having a frame shape and disposed on the exposed surface of the solid polymer electrolyte membrane so that the exposed surface is bonded to the inner protruding portion of the resin frame via the water-impermeable layer and an adhesive layer and so that a region of the exposed surface where the water-impermeable layer is disposed is larger than a region of the water-impermeable layer where the adhesive layer is applied, the water-impermeable layer overlapping the adhesive layer in a thickness direction, the water-impermeable layer being a different material than the adhesive layer,
   the resin frame and the solid polymer electrolyte membrane being bonded to each other via the water-impermeable layer and the adhesive layer, the water-impermeable layer being disposed so as to block water released from the solid polymer electrolyte membrane and prevent the water from reaching an interface with the adhesive layer.

8. The resin-framed membrane-electrode assembly according to claim 7,
   wherein the resin frame further includes
      an inner raised portion that is raised in the thickness direction of the resin frame and is disposed at an inner periphery end portion of the inner protruding portion, and
      an outer raised portion that is raised in the thickness direction and is disposed at the inner periphery base end,
   wherein the inner raised portion, the outer raised portion, and the water-impermeable layer shape the adhesive layer provided by application of an adhesive, and
   wherein the inner raised portion and a part of the outer raised portion overlap the water-impermeable layer.

9. The resin-framed membrane-electrode assembly according to claim 8, wherein a space is provided between an inner periphery end portion of the water-impermeable layer and an outer periphery end portion of the second electrode,
   wherein a second space is provided between the inner raised portion and the outer periphery end portion of the second electrode, and
   wherein the space is smaller than the second space.

10. The resin-framed membrane-electrode assembly according to claim 7, wherein a space is provided between an inner periphery end portion of the water-impermeable layer and an outer periphery end portion of the second electrode.

11. The resin-framed membrane-electrode assembly according to claim 7,
wherein a thickness of the water-impermeable layer is smaller than a thickness of the resin frame.

12. The resin-framed membrane-electrode assembly according to claim 7, wherein a part of the water-impermeable layer overlaps an inner peripheral end surface of the resin frame in the thickness direction of the resin frame.

13. The resin-framed membrane-electrode assembly according to claim 7, wherein the water-impermeable layer includes a pressure-sensitive adhesive, a liquid fluoro-elastomer, an epoxy-modified silicone resin, an acrylic resin, or a perfluorosulfonic acid.

14. The resin-framed membrane-electrode assembly according to claim 13, wherein the adhesive includes an epoxy adhesive, an acrylic adhesive, a polymer, or a fluorine-based elastomer.

15. A method for manufacturing a resin-framed membrane-electrode assembly for a fuel cell, the method comprising:
providing a stepped membrane-electrode assembly comprising:
a solid polymer electrolyte membrane having a first surface and a second surface opposite to the first surface;
a first electrode provided on the first surface; and
a second electrode provided on the second surface, the second surface having an exposed surface on an area outside of an outer periphery of the second electrode, the first electrode having a planar dimension larger than a planar dimension of the second electrode;
providing a resin frame to surround an outer periphery of the solid polymer electrolyte membrane, the resin frame comprising:
an inner periphery base end; and
an inner protruding portion protruding from the inner periphery base end so as to be provided on a second electrode side;
providing a water-impermeable layer having a frame shape on the exposed surface of the solid polymer electrolyte membrane so that the exposed surface is bonded to the inner protruding portion of the resin frame via the water-impermeable layer and an adhesive layer, so that a region of the exposed surface where the water-impermeable layer is disposed is larger than a region of the water-impermeable layer where the adhesive layer is applied, and so that the water-impermeable layer overlaps the adhesive layer in a thickness direction, the water-impermeable layer being a different material than the adhesive layer; and
bonding the resin frame and the solid polymer electrolyte membrane to each other via the water-impermeable layer and the adhesive layer, the water-impermeable layer disposed so as to block water released from the solid polymer electrolyte membrane and prevent the water from reaching an interface with the adhesive layer after the bonding.

16. The method according to claim 15,
wherein the resin frame further includes an inner raised portion that is raised in the thickness direction of the resin frame and is disposed at an inner periphery end portion of the inner protruding portion, and an outer raised portion that is raised in the thickness direction and is disposed at the inner periphery base end,
the method further comprising:
arranging the inner raised portion, the outer raised portion, and the water-impermeable layer to shape the adhesive layer provided by application of an adhesive; and
arranging the inner raised portion, the outer raised portion, and the water-impermeable layer so that the inner raised portion and a part of the outer raised portion overlap the water-impermeable layer.

17. The method according to claim 15, further comprising:
providing a space between an inner periphery end portion of the water-impermeable layer and an outer periphery end portion of the second electrode.

18. The method according to claim 15, wherein a part of the water-impermeable layer overlaps an inner peripheral end surface of the resin frame member in the thickness direction of the resin frame member after the bonding.

19. The method according to claim 15, wherein the water-impermeable layer includes a pressure-sensitive adhesive, a liquid fluoro-elastomer, an epoxy-modified silicone resin, an acrylic resin, or a perfluorosulfonic acid.

20. The method according to claim 19, wherein the adhesive includes an epoxy adhesive, an acrylic adhesive, a polymer, or a fluorine-based elastomer.

* * * * *